(12) United States Patent
Miki et al.

(10) Patent No.: US 9,898,837 B2
(45) Date of Patent: Feb. 20, 2018

(54) IMAGE PROCESSING SYSTEM

(71) Applicant: Mitsubishi Electric Corporation, Chiyoda-ku (JP)

(72) Inventors: Yohei Miki, Tokyo (JP); Yasunori Tsubaki, Tokyo (JP); Hiroshi Yoshida, Tokyo (JP)

(73) Assignee: Mitsubishi Electric Corporation, Chiyoda-ku (JP)

( * ) Notice: Subject to any disclaimer, the term of this patent is extended or adjusted under 35 U.S.C. 154(b) by 0 days.

(21) Appl. No.: 14/785,928

(22) PCT Filed: May 31, 2013

(86) PCT No.: PCT/JP2013/003441
§ 371 (c)(1),
(2) Date: Oct. 21, 2015

(87) PCT Pub. No.: WO2014/192044
PCT Pub. Date: Dec. 4, 2014

(65) Prior Publication Data
US 2016/0093071 A1 Mar. 31, 2016

(51) Int. Cl.
*G06T 11/00* (2006.01)
*G09G 5/14* (2006.01)
*G06T 11/60* (2006.01)

(52) U.S. Cl.
CPC ............ *G06T 11/001* (2013.01); *G06T 11/60* (2013.01); *G09G 5/14* (2013.01); *G09G 2340/125* (2013.01); *G09G 2340/14* (2013.01); *G09G 2354/00* (2013.01)

(58) Field of Classification Search
CPC ......... G09G 2340/12; G09G 2340/125; G09G 2340/14; H04N 9/75; H04N 1/3872; H04N 21/4318
See application file for complete search history.

(56) References Cited

U.S. PATENT DOCUMENTS

| 6,859,236 B2 | 2/2005 | Yui |
| 6,967,665 B2 | 11/2005 | Ishikawa et al. |
| 7,623,140 B1 * | 11/2009 | Yeh ........................ G06T 15/503 345/522 |

FOREIGN PATENT DOCUMENTS

| JP | 5 207368 | 8/1993 |
| JP | 5 316425 | 11/1993 |

(Continued)

OTHER PUBLICATIONS

International Search Report dated Aug. 13, 2013 in PCT/JP13/003441 filed May 31, 2013.

*Primary Examiner* — Antonio A Caschera
(74) *Attorney, Agent, or Firm* — Oblon, McClelland, Maier & Neustadt, L.L.P.

(57) ABSTRACT

An image processing device, an image processing system, and an image processing method according to the present invention include a mask determining unit that determines a vertical relation in an overlapping area when a video window and a still image window overlap. As a result of a determination, if it is decided that the still image window overlaps as an upper window, the mask process is performed, and if it is decided that the still image window overlaps as a lower window, the mask process is not performed, thereby allowing an appropriate composite image to be obtained regardless of the vertical relation in the overlapping area of the video window and the still image window.

1 Claim, 14 Drawing Sheets

(56) References Cited

FOREIGN PATENT DOCUMENTS

| | | |
|---|---|---|
| JP | 11 38951 | 2/1999 |
| JP | 11 327522 | 11/1999 |
| JP | 2000 78527 | 3/2000 |
| JP | 2001 242848 | 9/2001 |
| JP | 2003 348447 | 12/2003 |
| JP | 2010 109932 | 5/2010 |
| JP | 4541482 | 9/2010 |

* cited by examiner

IMAGE PROCESSING SYSTEM

TECHNICAL FIELD

The present invention relates to an image processing device, an image processing system, and an image processing method for generating an image by chroma key compositing.

BACKGROUND ART

Conventionally, an image processing device such as a PC (personal computer) allows pieces of content, such as a video which is created by an image creating device (hardware) such as an accelerator and a still image which is created by a GUI (graphical user interface), to be displayed in separate windows and to be viewed simultaneously (in the following description, a window displaying a still image will be referred to as a "still image window", and a window displaying a video will be referred to as a "video window"). As a technique for displaying pieces of content simultaneously as described above, chroma key compositing is known. Chroma key compositing is a scheme in which a specific color (color key) is set to an area where a video window is displayed on a main image which is drawn by a GUI or the like so as to make the area transparent to display the video window on the main image. However, in chroma key compositing, when a still image window overlaps over a video window and the color key is further used in the still image window in this overlapping area, a portion of the still image window where the color key is used also becomes transparent. To solve this problem, there is a technique for obtaining a correct composite image by performing a mask process (process to prevent the color key from becoming transparent) on an area where a window displaying a video and a window displaying a still image overlap (overlapping area) (for example, Patent Literature 1).

CITATION LIST

Patent Literature

Patent Literature 1: Japanese Patent No. 4541482

SUMMARY OF INVENTION

Technical Problem

However, an image processing device of Patent Literature 1 is based on the premise that a still image window overlaps over a video window, and there is a problem, which is that if the mask process is performed when a still image window overlaps under a video window, the mask process prevents an overlapping area from becoming transparent, although the video window needs to be displayed in the overlapping area of the still image window and the video window, and a desired composite image cannot be obtained.

It is therefore an object of the present invention to obtain a desired composite image when a still image window and a video window overlap, regardless of which of the still image window and the video window overlaps as an upper window.

Solution to Problem

An image processing device according to the present invention carries out chroma key compositing to layer a first layer image in which a first window for displaying a still image is drawn and a second layer image in which a second window for displaying a moving image is drawn, and to display the second window by making the first layer image transparent, and the image processing device includes:

a mask determining unit that determines an overlap relation between the first window and the second window in an area where the first window and the second window overlap; and a mask processing unit that, based on a determination by the mask determining unit, performs a mask process on an area where the first window overlaps as an upper window when it is determined that the first window overlaps as the upper window, and does not perform the mask process on an area where the second window overlaps as an upper window when it is determined that the second window overlaps as the upper window.

An image processing system according to the present invention carries out chroma key compositing to layer a first layer image in which a first window for displaying a still image is drawn and a second layer image in which a second window for displaying a moving image is drawn, and to display the second window by making the first layer image transparent, and the image processing system includes:

a mask determining unit that determines an overlap relation between the first window and the second window in an area where the first window and the second window overlap;

a mask processing unit that, based on a determination by the mask determining unit, performs a mask process on an area where the first window overlaps as an upper window when it is determined that the first window overlaps as the upper window, and does not perform the mask process on an area where the second window overlaps as an upper window when it is determined that the second window overlaps as the upper window;

a first layer image dividing unit that divides the first layer image;

a compositing device that composites the first layer image that is divided and the second layer image corresponding to the first layer image; and a plurality of display devices that display an image that is composited by the compositing device, wherein the plurality of display devices form one screen.

An image processing method according to the present invention is a method for carrying out chroma key compositing to layer a first layer image in which a first window for displaying a still image is drawn and a second layer image in which a second window for displaying a moving image is drawn, and to display the second window by making the first layer image transparent, and the image processing method includes:

a mask determining step of determining an overlap relation between the first window and the second window in an area where the first window and the second window overlap; and a mask processing step of, based on a determination in the mask determining step, performing a mask process on an area where the first window overlaps as an upper window when it is determined that the first window overlaps as the upper window, and not performing the mask process on an area where the second window overlaps as an upper window when it is determined that the second window overlaps as the upper window.

Advantageous Effects of Invention

An image processing device according to the present invention includes a mask determining unit that determines a vertical relation in an overlapping area when a video window and a still image window overlap. As a result of a determination, if it is decided that the still image window overlaps as an upper window, the mask process is performed, and if it is decided that the still image window overlaps as a lower window, the mask process is not performed, thereby allowing an appropriate composite image to be obtained regardless of the vertical relation in the overlapping area of the video window and the still image window.

DESCRIPTION OF EMBODIMENTS

First Embodiment

Figure 1:
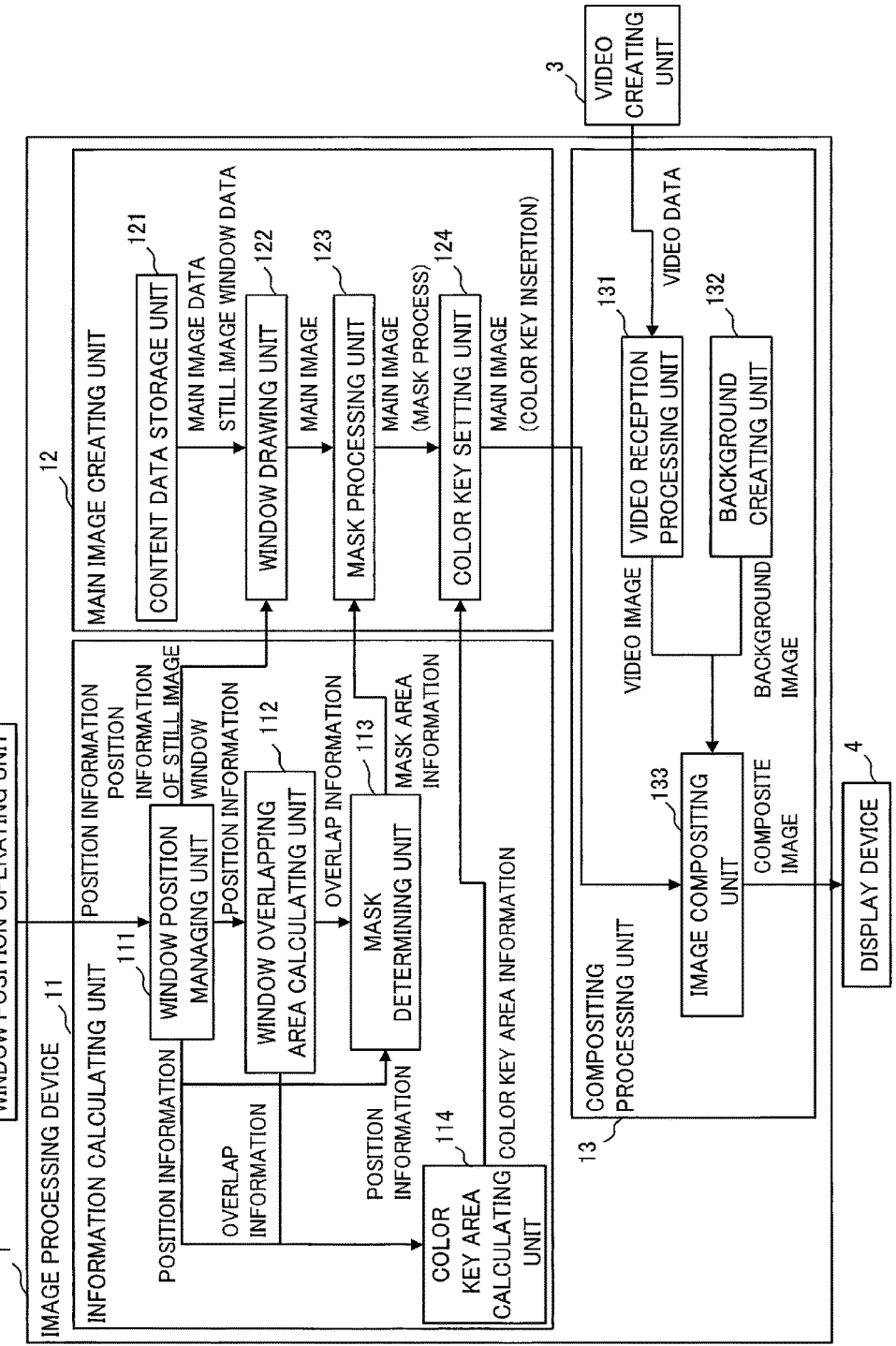
FIG. 1 is a diagram illustrating a configuration of an image processing device according to a first embodiment.
Figure 2:
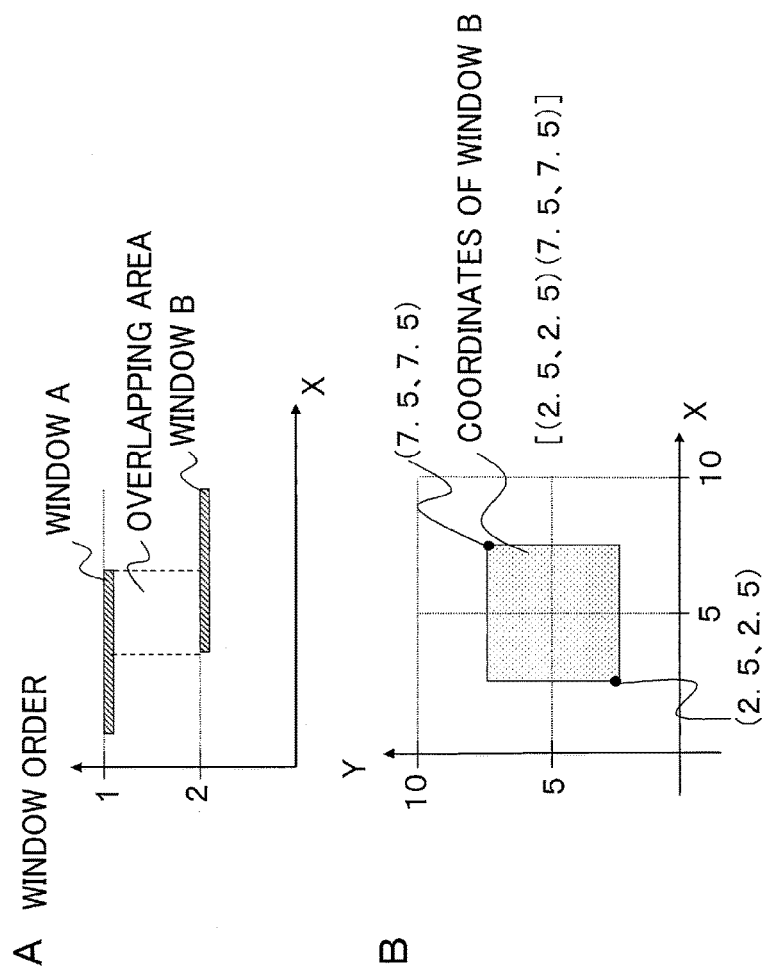
FIG. 2 is a diagram describing position information of a window position managing unit according to the first embodiment.
Figure 3:
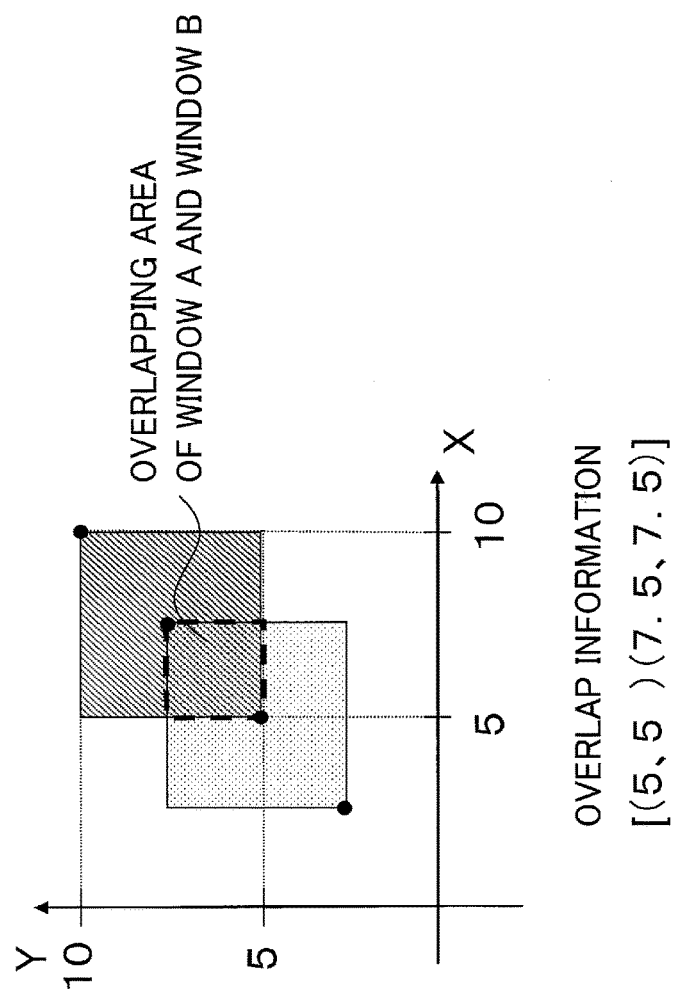
FIG. 3 is a diagram describing overlap information of a window overlapping area calculating unit according to the first embodiment.
Figure 4:
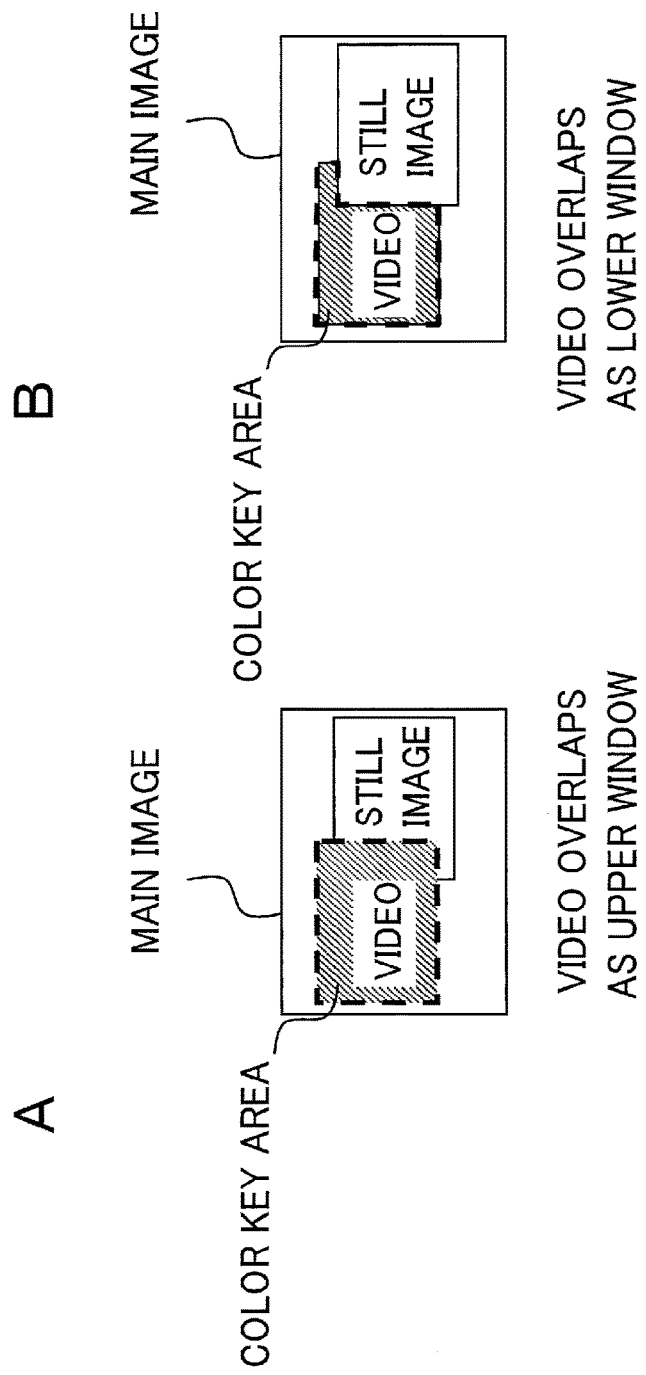
FIG. 4 is a diagram describing a color key area.
Figure 5:
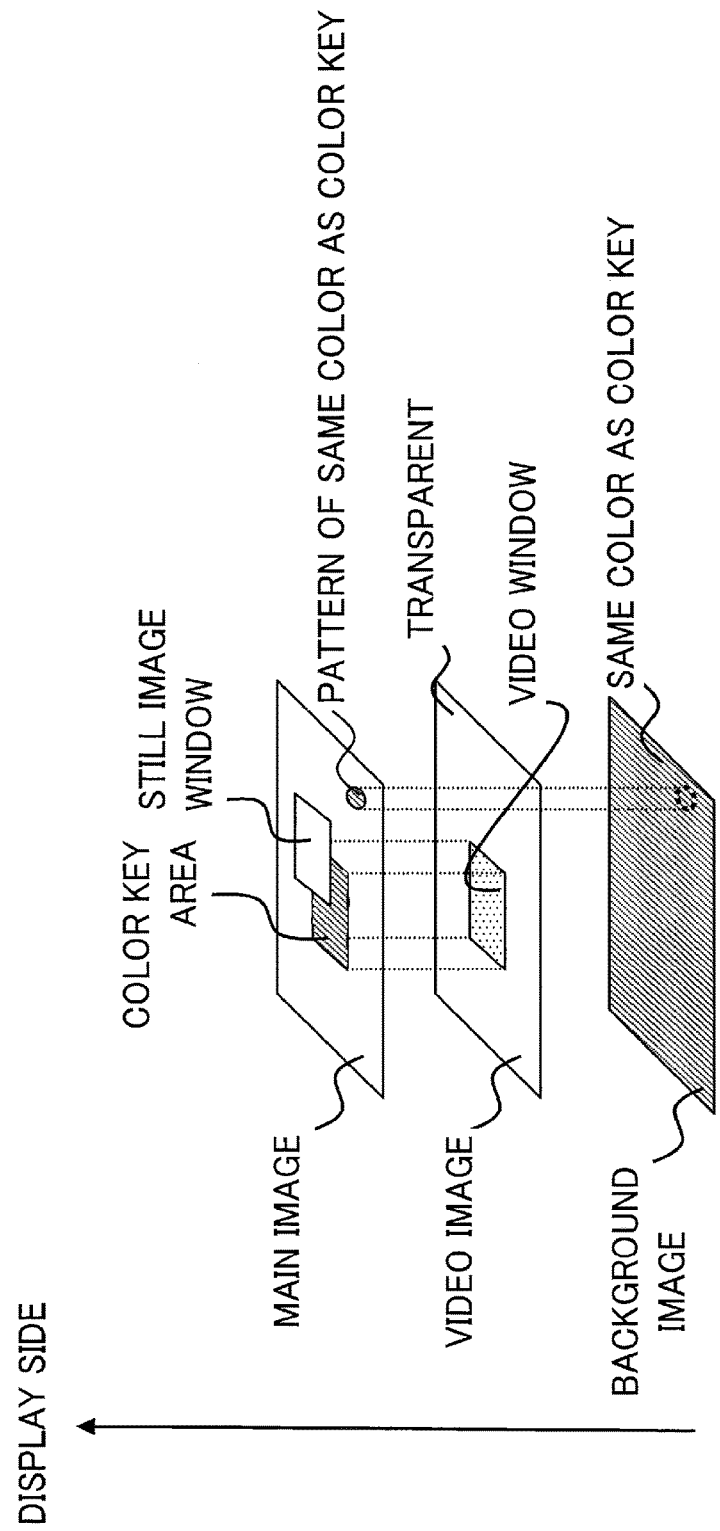
FIG. 5 is a diagram describing a background image.
Figure 6:
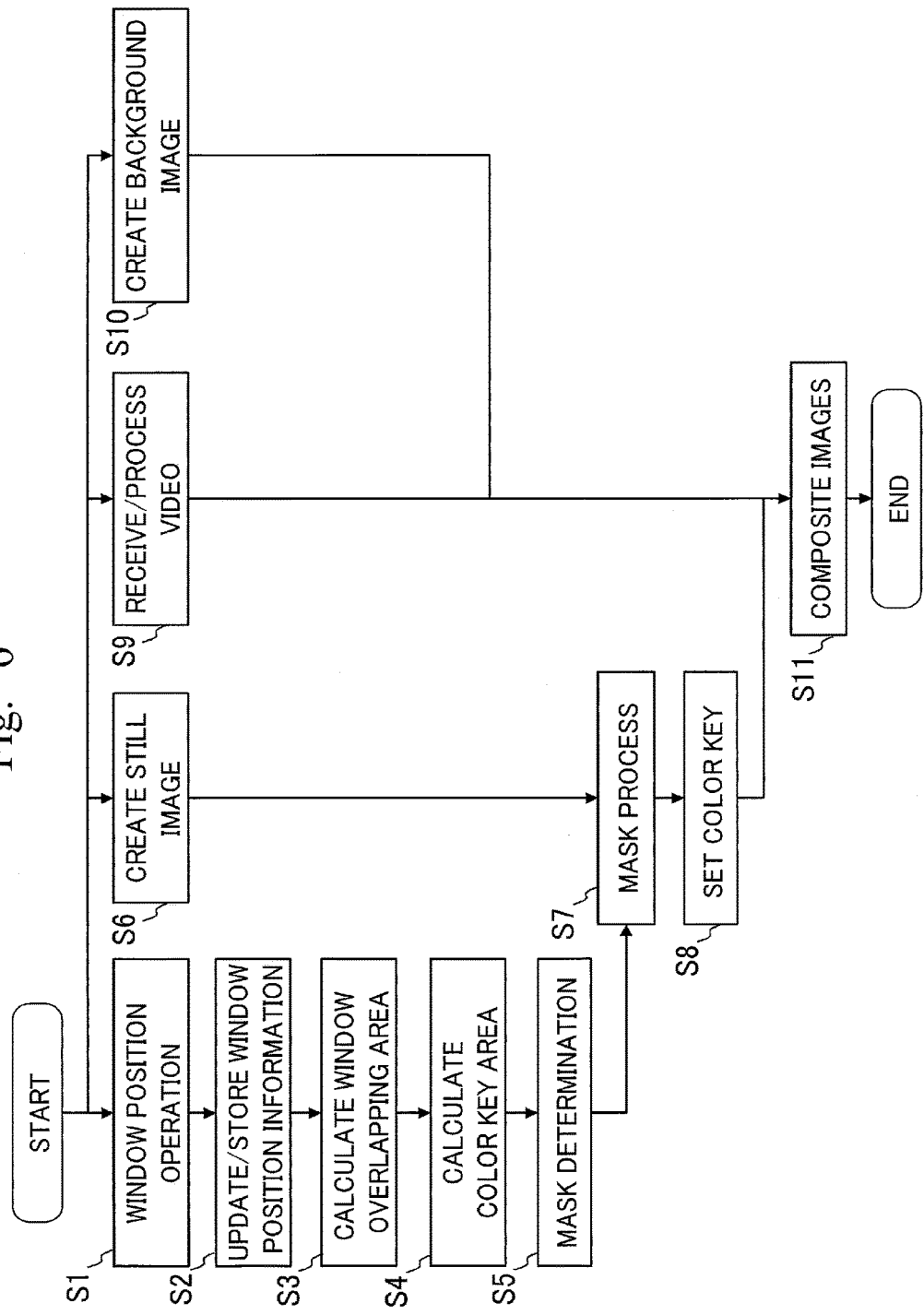
FIG. 6 is an operation flowchart of the image processing device according to the first embodiment.
Figure 7:
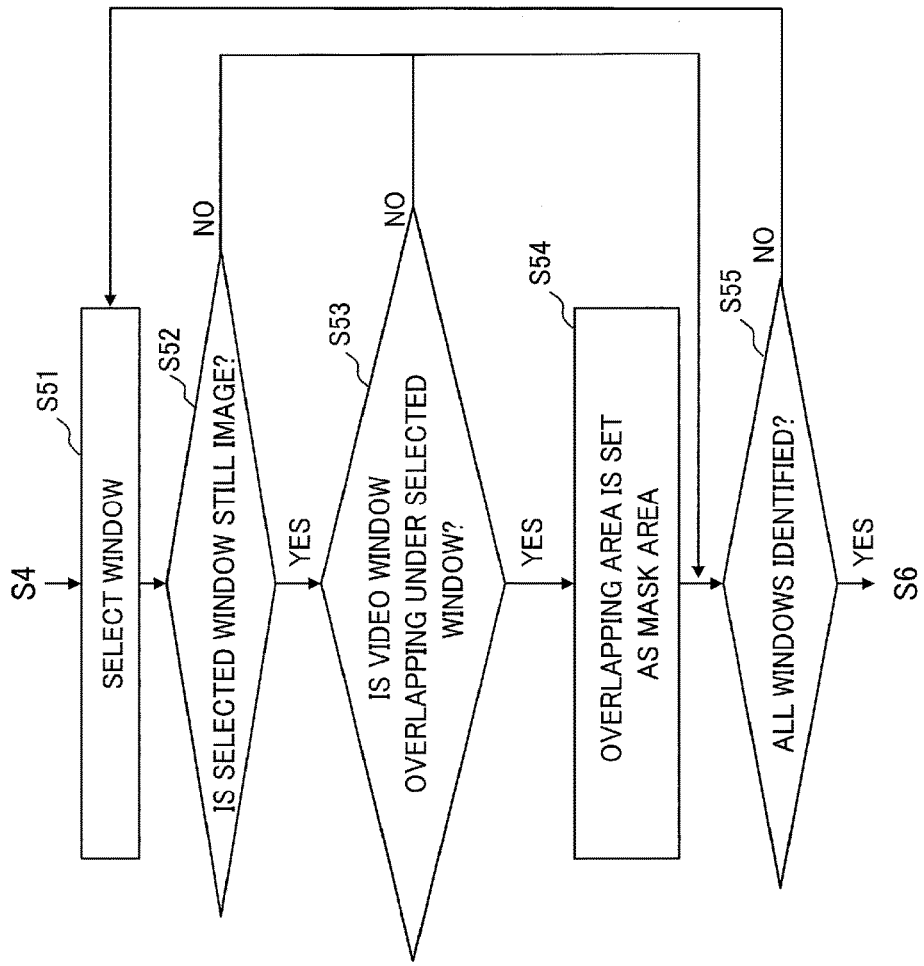
FIG. 7 is an operation flowchart of a mask determining unit according to the first embodiment.
Figure 8:
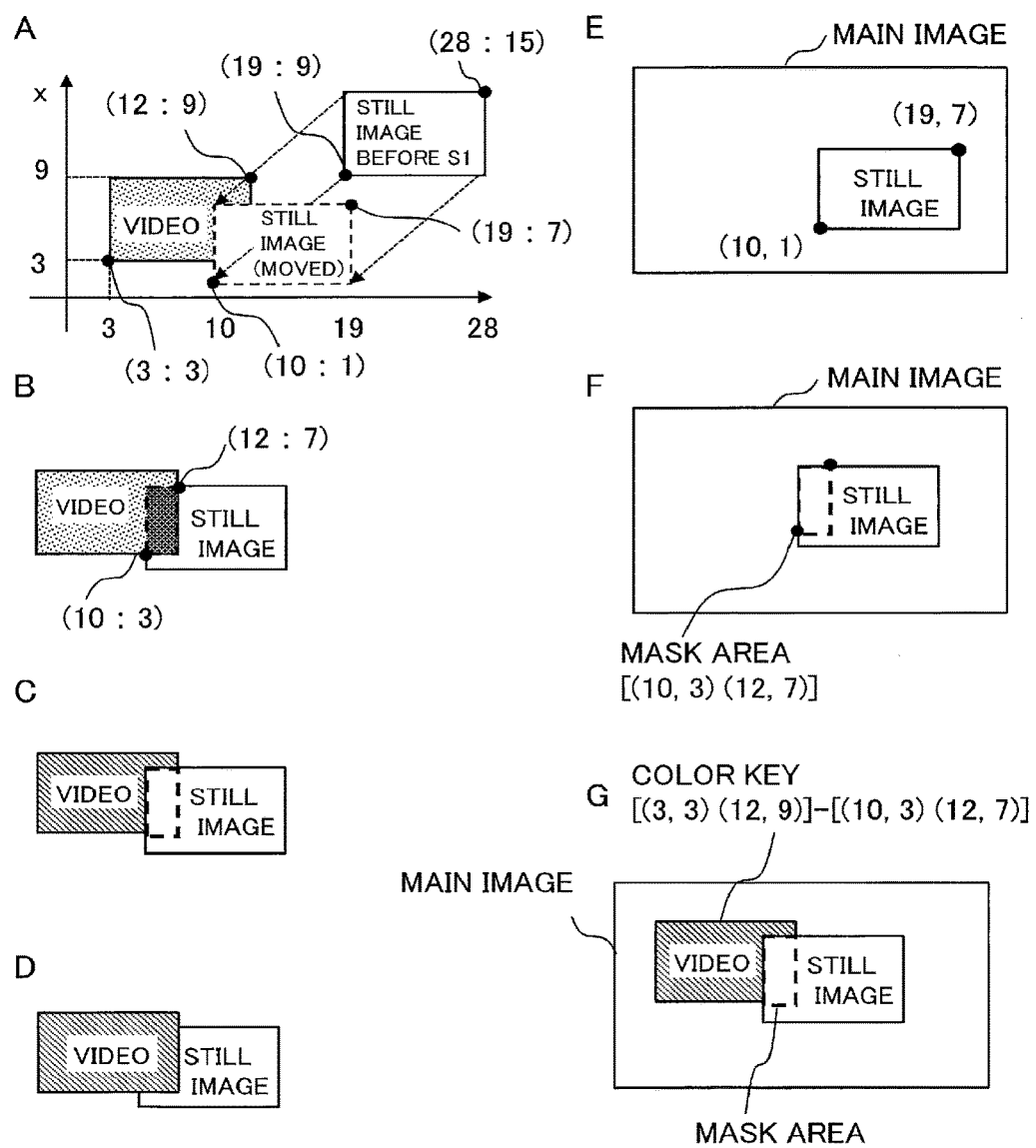
FIG. 8 illustrates examples of a main image that is created by a main image creating unit according to the first embodiment.
Figure 9:
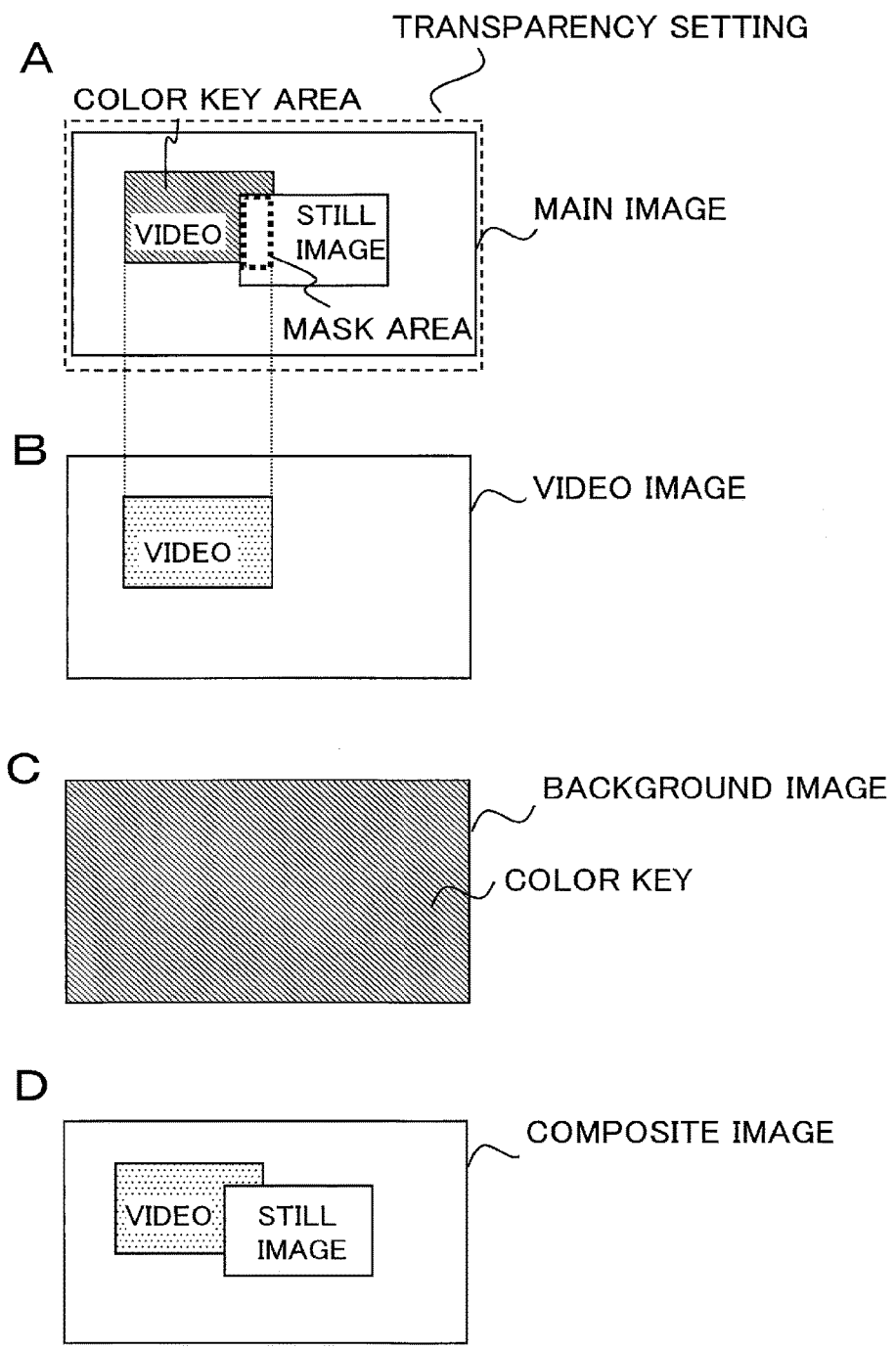
FIG. 9 illustrates an example of a composite image that is created by an image compositing unit according to the first embodiment.
Figure 10:
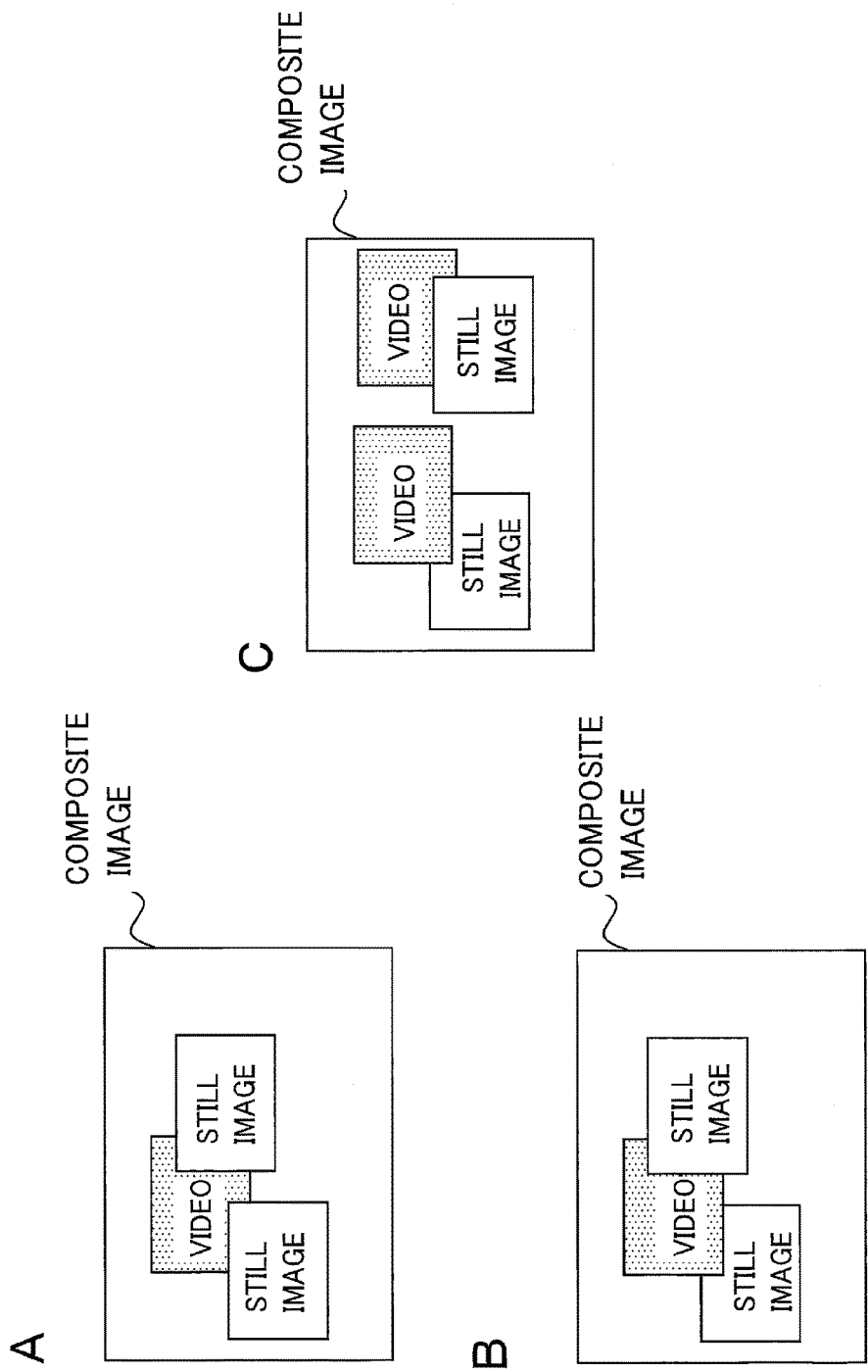
FIG. 10 illustrates examples of a composite image that can be created by the image compositing unit according to the first embodiment.

With reference to FIG. 1 to FIG. 10, an image processing device according to a first embodiment will be described hereinafter. FIG. 1 is a diagram illustrating a configuration of the image processing device according to the first embodiment. FIG. 2 is a diagram describing position information of a window position managing unit according to the first embodiment. FIG. 3 is a diagram describing overlap information of a window overlapping area calculating unit according to the first embodiment. FIG. 4 is a diagram describing a color key area. FIG. 5 is a diagram describing a background image. FIG. 6 is an operation flowchart of the image processing device according to the first embodiment. FIG. 7 is an operation flowchart of a mask determining unit according to the first embodiment. FIG. 8 illustrates examples of a main image that is created by a main image creating unit according to the first embodiment. FIG. 9 illustrates an example of a composite image that is created by an image compositing unit according to the first embodiment. FIG. 10 illustrates examples of a composite image that can be created by the image compositing unit according to the first embodiment.

With reference to FIG. 1, the configuration of an image processing device 1 according to the first embodiment will be described hereinafter.

The image processing device 1 according to the first embodiment is composed of an information calculating unit 11, a main image creating unit 12, and a compositing processing unit 13. When the position of a window is moved by a window position operating unit 2 (for example, a mouse or the like in a PC), the image processing device 1 obtains position information of a moved still image window or a moved video window from the window position operating unit 2, and creates a main image (first layer image) having a still image window (first window). Further, the image processing device 1 composites the created main image and a video image (second layer image) having a video window to create a composite image, and outputs the composite image to a display device 4.

A configuration of the information calculating unit 11 will now be described. The information calculating unit 11 calculates information for creating a main image. The information calculating unit 11 is composed of a window position managing unit 111, a window overlapping area calculating unit 112, a mask determining unit 113, and a color key area calculating unit 114.

The window position managing unit 111 holds position information of every window to be displayed on a composite image. The window position managing unit 111 obtains position information from the window position operating unit 2 and updates the position information of a window to be displayed. The position information of a window to be used in the description of the image processing device 1 according to the first embodiment will be described hereinafter.

The position information of a window is information for identifying a window order, coordinates, and a window type. The window order indicates an order in which windows overlap. In A of FIG. 2, for example, a vertical axis indicates the window order when windows overlap. This window order indicates that a smaller number is displayed as an upper window, that is, preferentially in an overlapping area. For example, when a window A and a window B overlap, the window order of the window A is "1" and the window order of the window B is "2". Therefore, when the window A and the window B overlap, the window A is displayed in that overlapping area.

The window coordinates indicate the coordinates of a window to be displayed on the display device 4. In B of FIG. 2, for example, the coordinates of the window B are represented as [(2.5, 2.5)(7.5, 7.5)]. "(2.5, 2.5)" is the XY coordinates of the lower-left corner of the window B, and "(7.5, 7.5)" is the XY coordinates of the upper-right corner of the window B. Based on the window coordinates, each component of the image processing device 1 can decide the position in the display device 4 where the window is to be displayed.

The window type is an identifier indicating whether the window is a still image window or a video window. For example, S indicates a still image window and V indicates a video window.

The position information of a window is displayed in the order of the window order, the window type, and the coordinates. In B of FIG. 2, for example, when the window B is a video window, the position information of the window B is represented as 2V [(2.5, 2.5)(7.5, 7.5)].

In the following description, the position information of a window is represented using the method described with reference to FIG. 2. However, for the image processing device 1 according to the first embodiment, the method for representing the position information of a window is not limited to this method, and any method may be used with which the window order, the window type, and the window coordinates can be identified. For example, the coordinates may be represented by the horizontal and vertical lengths of the window and the XY coordinates of one corner of the window.

The window overlapping area calculating unit 112 obtains the position information of each window from the window position managing unit 111, and calculates a window overlapping area. The window overlapping area calculating unit 112 stores the calculated window overlapping area as overlap information. The overlapping area is an area where two windows overlap. The overlap information is information on the overlapping area which is represented in a data format such as coordinates. In FIG. 3, for example, the coordinates of the window A are [(5, 5)(10, 10)] and the coordinates of the window B are [(2.5, 2.5)(7.5, 7.5)]. Thus, the overlapping area is an area enclosed by a dashed line in FIG. 3, and the overlap information is [(5, 5)(7.5, 7.5)].

The mask determining unit 113 decides a vertical relation between the windows in the overlapping area based on the position information and the overlap information of the windows, and determines whether or not a mask process is required. The mask determining unit 113 also calculates a mask area based on the position information and the overlap information of the windows. The mask process is a process to prevent the main image from becoming transparent. Specifically, the mask process is a process to disable a transparency flag for transparency setting to be described later. The mask area is an area on which the mask process is performed. The area on which the mask process is performed is an area where a still image overlaps on top in the overlapping area. That is, the mask area signifies an area where a still image window is to be displayed in the overlapping area. The mask determining unit 113 holds the calculated mask area as mask area information. The mask area information is information on the mask area which is represented in a data format such as coordinates.

The color key area calculating unit 114 calculates an area (color key area) for setting a color key on the main image to a portion where a video window is to be made transparent, based on the position information and the overlap information of the windows. Specifically, when the video window overlaps over of the still image window, the color key area calculating unit 114 calculates the color key area as a shaded portion in A of FIG. 4. When the video window overlaps under the still image window, the color key area calculating unit 114 calculates the color key area as an area obtained by excluding the overlapping area of the video window and the still image window from the entire area of the video window (shaded portion in B of FIG. 4). After calculating the color key area, the color key area calculating unit 114 holds information on the color key area as color key area information. The color key area information is information on the color key area which is represented in a data format such as coordinates.

A configuration of the main image creating unit 12 will now be described. The main image creating unit 12 creates a main image. The main image creating unit 12 is composed of a content data storage unit 121, a window drawing unit 122, a mask processing unit 123, and a color key setting unit 124.

The content data storage unit 121 holds data of the main image and data of a still image window (first window) to be drawn on the main image. The data of the main image is information for drawing the main image. In a PC, for example, information for configuring a desktop image corresponds to the data of the main image. The data of the still image window is data of content, such as a picture, to be drawn on the window of the main image.

The window drawing unit 122 obtains the data of the main image and the data of the still image window which are held in the content data storage unit 121, and draws the main image. The window drawing unit 122 also draws the still image window on the main image. The position of the still image window is decided by obtaining the position information of the still image window from the window position managing unit 111.

The mask processing unit 123 obtains the mask area information from the mask determining unit 113 and carries out the mask process. When the mask area information is output from the mask determining unit 113, the mask processing unit 123 decides that the mask process is required and carries out the mask process on the mask area. When the mask area information is not output from the mask determining unit 113, the mask processing unit 123 decides that the mask process is not required and does not carry out the mask process. Note that the mask processing unit 123 is not limited to being configured to make a decision based on whether or not the mask area information is output from the mask determining unit 113. The mask processing unit 123 may be configured to switch between enabling and disabling the mask process based on whether a bit is 1 or 0. In this case, the mask determining unit 113 is required to output the mask area information and the bit indicating whether or not the mask process is required.

The color key setting unit 124 obtains the color key area information from the color key area calculating unit 114 and sets the color key to the main image. After setting the color key, the color key setting unit 124 carries out transparency setting. The transparency setting means enabling the flag (transparency flag) for making the color key area transparent when a composite image is displayed on the display device 4. The transparency flag is disabled for the area where the mask process is performed by the mask processing unit 123.

A configuration of the compositing processing unit 13 will now be described. The compositing processing unit 13 processes video data obtained from a video creating unit 3 to create a video image and composites this video image and the main image created by the main image creating unit 12. The compositing processing unit 13 is composed of a video reception processing unit 131, a background creating unit 132, and an image compositing unit 133.

The video reception processing unit 131 receives data of a video window and creates a video image.

The background creating unit 132 creates a background image. The background image is image data that exists on a layer under the main image and the video image. FIG. 5 illustrates layered images to be composited by the image processing device 1 according to the first embodiment. The compositing processing unit 13 arranges the main image, the video image, and the background image in this order from the top. At this time, the color key is placed on the main image at the position where the video is to be displayed. The video image is configured to be transparent except for an area where the video window is placed. At this time, the background image is configured to be the same color as the color key. With this configuration, even if the main image includes a pattern or the like of the same color as the color key at a portion other than the color key area, the pattern of the same color as the color key becomes transparent, but is displayed properly because the background is shown.

The image compositing unit 133 composites the main image, the video image, and the background image. The images to be composited are layered as illustrated in FIG. 5, and the main image, the video image, and the background image are composited in this order from the top. The image compositing unit 133 transmits composite image data to the display device 4. The display device 4 receives and displays the composite image data.

With reference to FIG. 6, FIG. 7, and FIG. 8, the operation of the image processing device 1 according to the first embodiment will now be described. In the description of the operation of the image processing device 1 according to the first embodiment, an example where there are two windows will be described. In this example, the two windows are a still image window and a video window. The description begins at the point where the still image window is moved over the video window. In the description of the operation of the image processing device 1 according to the first embodiment, the coordinates of each window are represented by the XY coordinates of the lower-left corner and the XY coordinates of the upper-right corner. In the following description, the position information of the still image window is 1S[(19, 9)(28, 15)] and the position information of the video window is 1V[(3, 3)(12, 9)] before S1 is started.

In S1, the position of the still image window is operated by the window position operating unit 2. In this example, the still image window is moved to coordinates [(10, 1)(19, 7)] as illustrated in A of FIG. 8. At this time, the window position operating unit 2 outputs the position information of the moved still image window 1S[(10, 1)(19, 7)] to the window position managing unit 111. The moved still image window overlaps over the video window, so that the window order is 1 indicating an uppermost window.

In S2, the window position managing unit 111 obtains the position information of the still image window 1S[(10, 1)(19, 7)], and updates the position information of the still image window. The window position managing unit 111 also updates the window order of the video window to 2. The window order of the video window is updated to 2 because the video window overlaps under the still image window as a result of moving the still image window.

In S3, the window overlapping area calculating unit 112 calculates overlap information of the windows [(10, 3)(12, 7)] based on the position information of the still image window 1S[(10, 1)(19, 7)] and the position information of the video window 2V[(3, 3)(12, 9)] (B of FIG. 8). In B of FIG. 8, a shaded portion indicates an overlapping area.

In S4, the color key area calculating unit 114 obtains the position information of the still image window 1S[(10, 1)(19, 7)] and the position information of the video window 2V[(3, 3)(12, 9)] which are held in the window position managing unit 111, obtains the overlap information of the windows [(10, 3)(12, 7)] from the window overlapping area calculating unit 112, and calculates the color key area. In this case, the window order of the still image window is "1". Thus, the color key area is a portion obtained by excluding the overlapping area of the windows from the entire display position of the video window. The color key area is represented as [(3, 3)(12, 9)]-[(10, 3)(12, 7)] using the position information of the video window [(3, 3)(12, 9)] and the overlapping information of the windows [(10, 3)(12, 7)]. In this example, the color key area is an area indicated by a diagonally hatched portion in C of FIG. 8. If the still image window overlaps under the video window, the color key area is the entire display position of the video window as illustrated in D of FIG. 8.

In S5, the mask determining unit 113 determines which of the still image window and the video window overlaps as an upper window. With reference to FIG. 7, a mask determination process in S5 will be described in detail hereinafter.

In S51, the mask determining unit 113 obtains the position information of the still image window 1S[(10, 1)(19, 7)] and the position information of the video window 2V[(3, 3)(12, 9)] from the window position managing unit 111. Then, the mask determining unit 113 selects one of the two windows. In this example, the mask determining unit 113 selects a window starting from the one having the largest X coordinate of the upper-right corner out of the coordinates of all the windows. Therefore, the mask determining unit 113 selects the still image window [(10, 1)(19, 7)] out of the two windows.

In S52, the mask determining unit 113 determines whether the window selected in S51 is a video window or a still image window. In S51, the mask determining unit 113 has selected the still image window. As a result, processing proceeds to S53. At this time, if the video window has been selected in S51, processing proceeds to S55.

In S53, the mask determining unit 113 determines whether or not a video window overlaps under the still image window determined in S52. In this example, the window order of the still image window is "1" and the window order of the video window is "2". Thus, the mask determining unit 113 determines that the video window overlaps under the still image window. As a result, processing proceeds to S54. If the mask determining unit 113 determines that the video window overlaps over the still image window, processing proceeds to S55.

In S54, the mask determining unit 113 obtains the overlap information of the windows [(10, 3)(12, 7)] from the window overlapping area calculating unit 112, and calculates the mask area. In this example, an area where the still image window overlaps as an uppermost window in the overlapping area is [(10, 3)(12, 7)] which is the same as the overlapping area of the windows (shaded portion in B of FIG. 8). The mask determining unit 113 outputs the calculated mask area to the mask processing unit 123 as mask area information [(10, 3)(12, 7)].

In S55, if the mask determining unit 113 has selected all the windows in S51, processing proceeds to S6. On the other hand, if there is an unselected window, processing returns to S51 and steps S51 to S55 are repeated. In this example, the video window has not been selected in S51, so that processing returns to S51. Then, the mask determining unit 113 carries out S51 to S55 repeatedly until all the windows are selected.

In S6, the window drawing unit 122 obtains the data of the main image and the data of the still image window from the content data storage unit 121. The window drawing unit 122 also obtains the position information of the still image window 1S[(10, 1)(19, 7)] from the window position managing unit 111. Further, the window drawing unit 122 draws the still image window on the main image at the coordinates [(10, 1)(19, 7)] indicated by the window position information (E of FIG. 8).

In S7, since it is determined in S5 that the mask process is required, the mask processing unit 123 performs the mask process on the main image based on the mask area information [(10, 3)(12, 7)] (area enclosed by a dotted line in F of FIG. 8).

In S8, the color key setting unit 124 sets the color key to the main image based on the color key area [(3, 3)(12, 9)]-[(10, 3)(12, 7)] calculated by the color key area calculating unit 114 in S4 (G of FIG. 8). After setting the color key, the color key setting unit 124 performs the transparency setting on the main image (portion enclosed by a dashed line in A of FIG. 9). The color key setting unit 124 outputs the created main image to the image compositing unit 133. When S8 is finished, the main image is completed (A of FIG. 9).

In S9, the video reception processing unit 131 receives video data from the video creating unit 3. The video reception processing unit 131 receives the video data and creates a video image (B of FIG. 9). It is assumed that the video reception processing unit 131 has obtained the position information of the video window from the window position managing unit 111 (not illustrated). The video reception processing unit 131 outputs the created video image to the image compositing unit 133.

In S10, the background creating unit 132 creates a background image (C of FIG. 9). The background creating unit 132 outputs the created background image to the image compositing unit 133.

In S11, the image compositing unit 133 composites the main image, the video image, and the background image that have been created in steps S1 to S10. The image compositing unit 133 outputs a composite image to the display device 4. When the operation in S11 is finished, the display device 4 displays the composite image created in the image processing device 1 (D of FIG. 9). This completes the operation of the image processing device 1 according to the first embodiment.

In the image processing device 1 according to the first embodiment, the content to be displayed on the window drawn on the main image may be a moving image as long as the content is drawn in the image processing device 1.

In the description of the image processing device 1 according to the first embodiment, the content to be displayed on the video window is a video, that is, a moving image. However, the content to be displayed on the video window may be a still image as long as the content is created by the video creating unit 3, such as an accelerator, or external hardware similar to this.

In the image processing device 1 according to the first embodiment, it is described that the window position operating unit 2 and the display device 4 are provided external to the image processing device 1. However, the configuration is not limited to this and the window position operating unit 2 and the display device 4 may be provided in the image processing device 1.

In the image processing device 1 according to the first embodiment, the mask determining unit 113 is configured to obtain the window position information from the window position managing unit 111. However, the configuration is not limited to this and the mask determining unit 113 may obtain the window position information from the window overlapping area calculating unit 112.

In the image processing device 1 according to the first embodiment, the color key area calculating unit 114 is configured to obtain the window position information from the window position managing unit 111 and the overlap information from the window overlapping area calculating unit 112 and calculate the color key area. However, the configuration is not limited to this and the color key area calculating unit 114 may obtain the position information from the window position managing unit 111 and calculate the overlap information.

It is described that in step S51 of selecting a window the mask determining unit 113 according to the first embodiment selects a window starting from the one having the largest X coordinate of the upper-right corner. However, the present invention is not limited to this, and any arrangement may be used as long as before S7 is started all the windows have been selected in step S5 of determining whether or not the mask process is required. For example, in S51 the mask determining unit 113 may select a window starting from the one having the smallest X coordinate of the lower-left corner.

The image processing device 1 according to the first embodiment is configured to determine that the mask process is required when a still image window overlaps over a video window in an area where the video window and the still image window overlap. Thus, even when a video window and a still image window overlap, a desired image can be obtained.

The mask determining unit 113 according to the first embodiment is configured to select a still image window one by one in S51 illustrated in FIG. 7 and determine the overlap relation between the video window and the still image window. Thus, even when a plurality of still images overlap with one video window, whether or not the mask process is required can be determined for each still image. For example, even when a plurality of still images overlap over a video window (A of FIG. 10) or when one still image window overlaps over a video window and another still image window overlaps under the video window (B of FIG. 10), the image processing device 1 according to the first embodiment can create a desired composite image. Even when there are two pairs of a still image window and a video window overlapping with each other, a determination concerning the mask process can be performed in accordance with the operation flowchart of the mask determining unit illustrated in FIG. 7 (C of FIG. 10).

Second Embodiment

Figure 11:
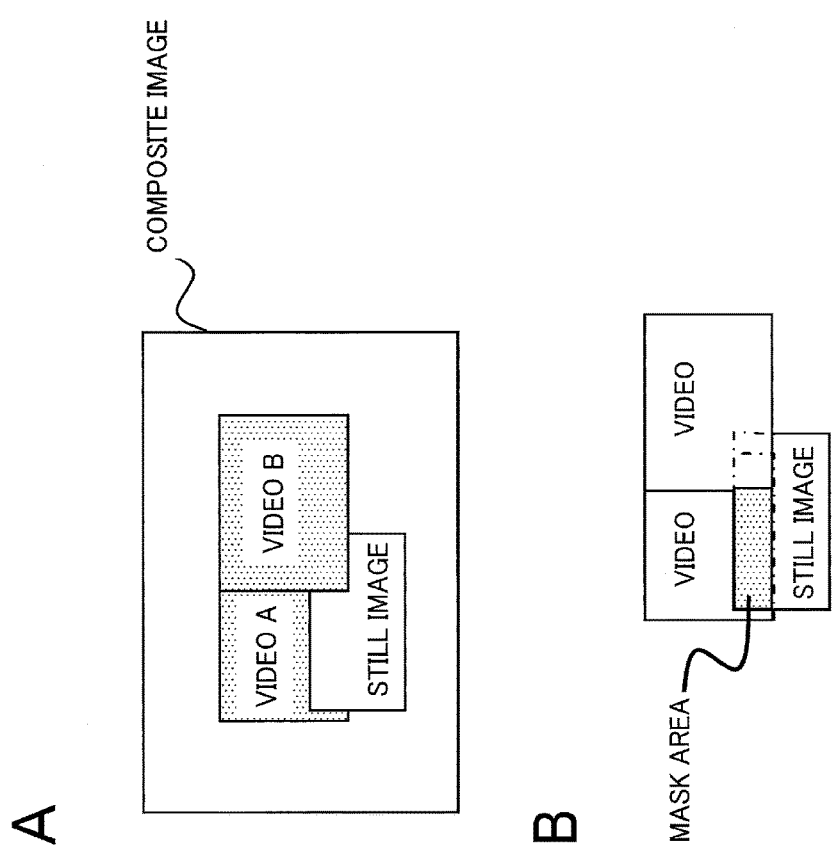
FIG. 11 is a diagram describing an overlapping area and a mask area according to a second embodiment.
Figure 12:
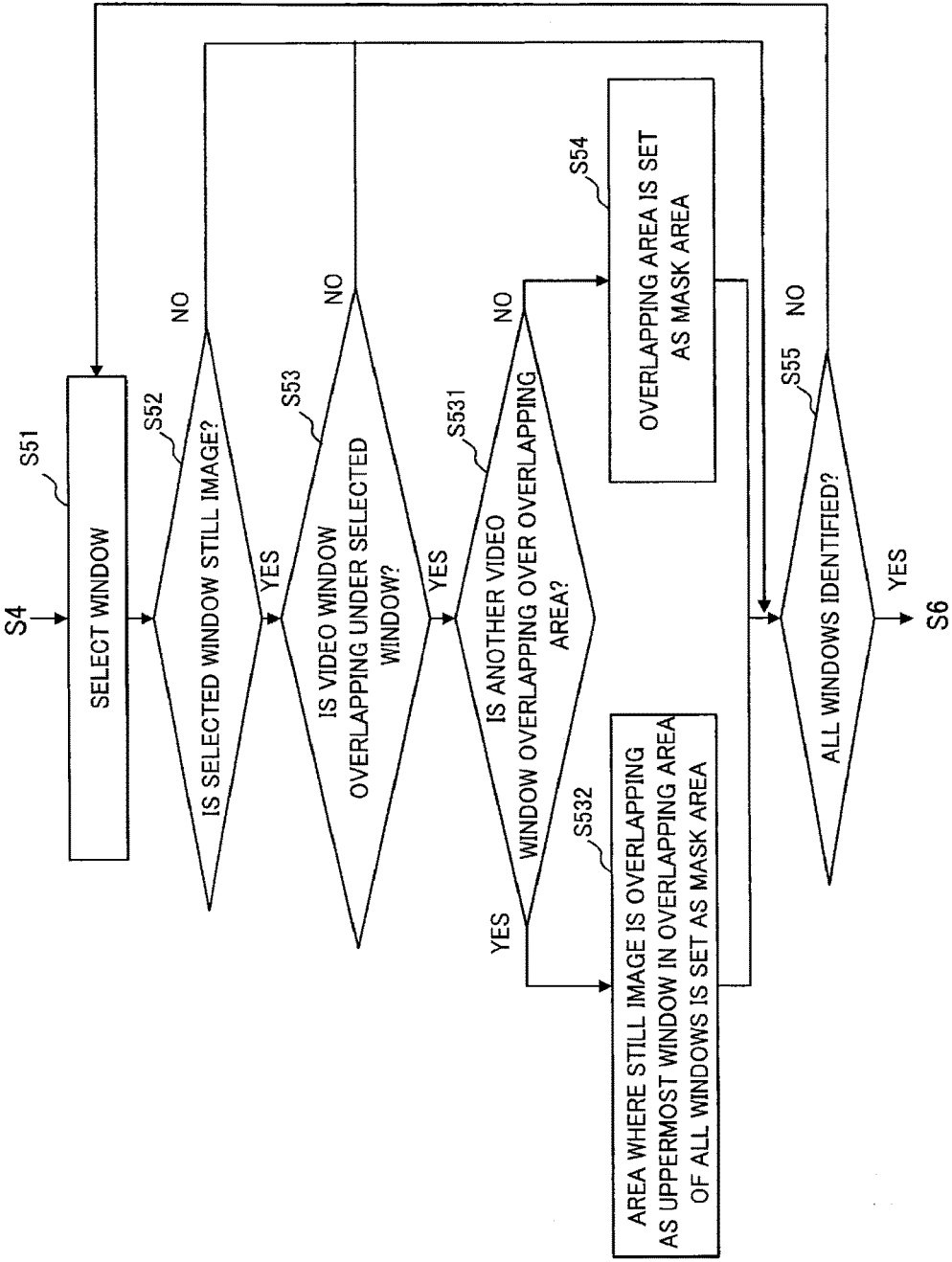
FIG. 12 is an operation flowchart of a mask determining unit according to the second embodiment.

With reference to FIG. 11 and FIG. 12, an image processing device 1 according to a second embodiment will be described hereinafter. FIG. 11 is a diagram describing an overlapping area and a mask area according to the second embodiment. FIG. 12 is an operation flowchart of a mask determining unit according to the second embodiment. With respect to a configuration of the image processing device 1 according to the second embodiment, portions corresponding to the configuration of the image processing device 1 according to the first embodiment will be given the same reference signs as those illustrated in FIG. 1 and description of these portions will be omitted.

The image processing device according to the second embodiment is characterized in that whether or not the mask process is required is determined when there is another window further overlapping with a window overlapping area. For example, in a composite image illustrated in A of FIG. 11, a still image window overlaps over a video window A and a video window B further overlaps over this overlapping area. The image processing device 1 according to the second embodiment carries out an image process in such a case.

The configuration of the image processing device 1 according to the second embodiment is the same as the configuration of the image processing device 1 according to the first embodiment, and thus description will be omitted.

The operation of the image processing device 1 according to the second embodiment will now be described. The operation of the image processing device 1 according to the second embodiment is the same as S1 to S4 (from when a window is operated to the step of calculating the color key area), S6 to S11 (from the step of drawing the still image window to the step of compositing the main image, the video image, and the background image), and S51 to S53 of S5 (from when a window is selected by the mask determining unit 113 to the step of determining whether or not a video window overlaps under the selected window) which are illustrated in FIG. 6 and FIG. 7. S531 and S532 in FIG. 12 will be described in detail hereinafter. In the following description, the image processing device 1 according to the second embodiment will be described using an example of creating the composite image illustrated in A of FIG. 11.

Before describing S531, it is assumed that "Yes" is selected in S52 and S53 respectively. That is, it is assumed that the still image window in A of FIG. 11 is selected in S51, that the window selected in S51 is determined as a still image window in S52, and that it is determined that the video window A overlaps under the still image in S53.

In S531, the mask determining unit 113 determines whether or not another video window, that is a video window other than the video window A, overlaps over the selected still image window. In this example, the video window B in A of FIG. 11 overlaps over the still image window. Therefore, processing proceeds to S532. At this time, if the video window B does not overlap over the still image window, the windows are layered as illustrated in C of FIG. 8 of the first embodiment. Therefore, processing proceeds to S54. If processing proceeds to S54, the process thereafter is the same as the operation described in the first embodiment.

In S532, the mask determining unit 113 determines the mask area as an area where the still image overlaps on top of the other windows in an area where the still image window overlaps with the other video windows. The mask area can be calculated easily based on the window position information obtained in S51 and the overlap information of the windows obtained in S53. In this example, an area indicated in B of FIG. 11 becomes the mask area.

The operation thereafter is the same as the operation of the image processing device 1 according to the first embodiment and thus description will be omitted.

As described above, even when a still image window overlaps over a video window and another video window further overlaps over this overlapping area, the image processing device 1 according to the second embodiment determines the overlap relation among the video windows and the still image window, makes a decision on whether or not the mask process is required, and calculates the mask area. Thus, even when a still image window overlaps over a video window and another video window further overlaps over this overlapping area, a desired composite image can be obtained.

Third Embodiment

An image processing device 1a according to a third embodiment is characterized in that a main image to be displayed with a plurality of display devices 4a to 4h constituting a large screen is divided and divided pieces of the main image are transmitted to a plurality of compositing devices.

Figure 13:
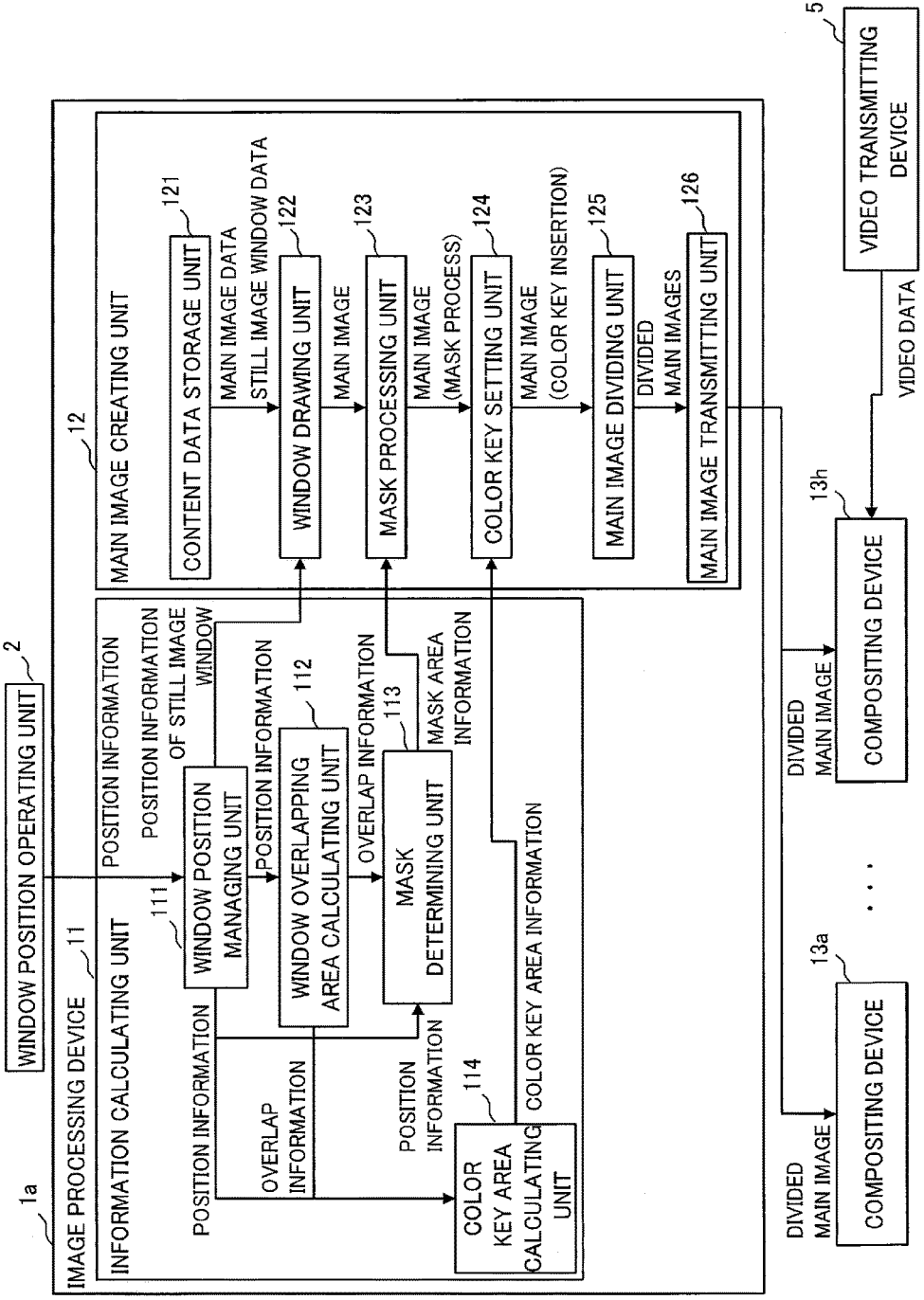
FIG. 13 is a diagram illustrating a configuration of an image processing device according to a third embodiment.
Figure 14:
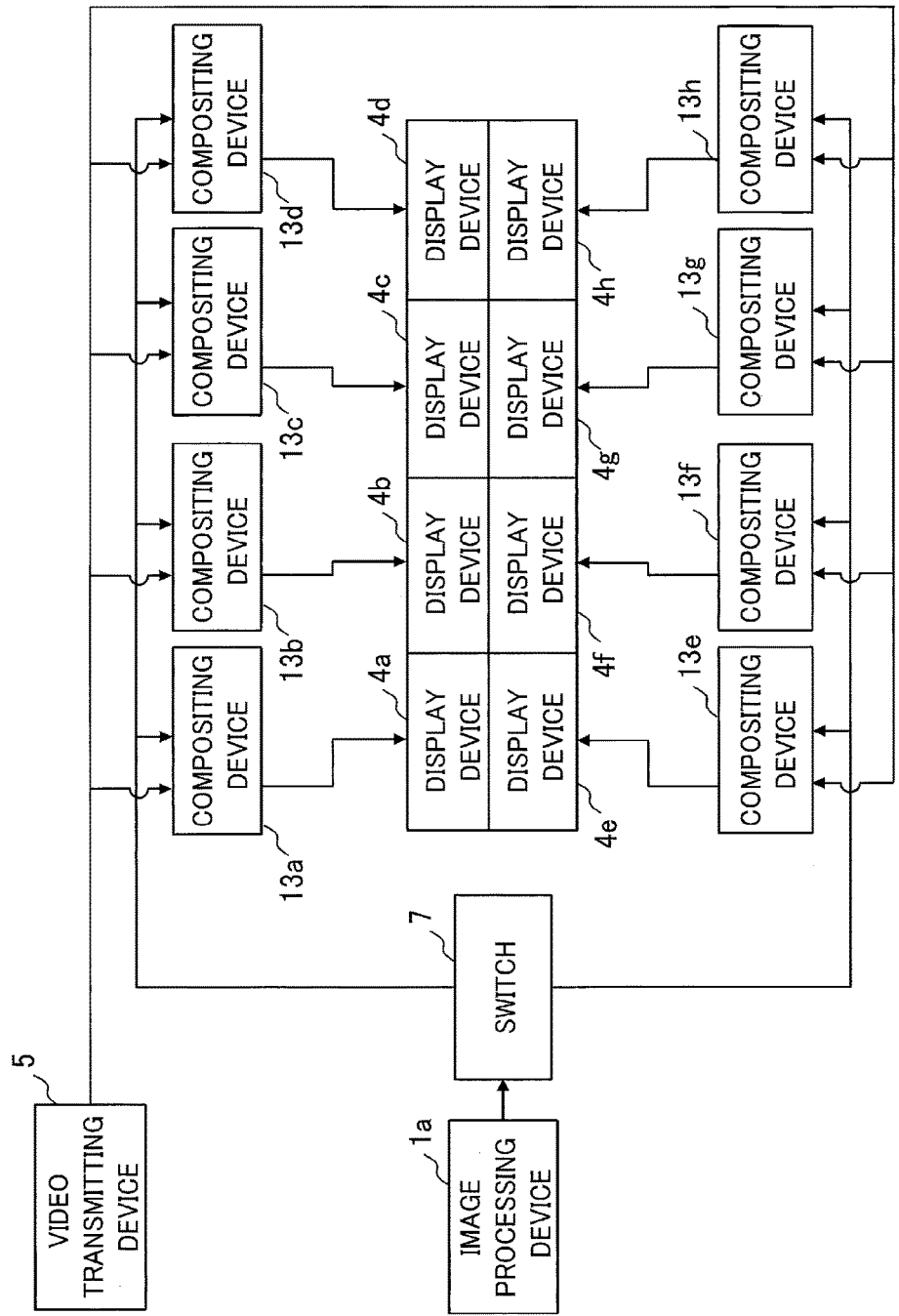
FIG. 14 is a diagram illustrating a configuration of an image display system using the image processing device according to the third embodiment.

With reference to FIG. 13 and FIG. 14, the image processing device 1a according to the third embodiment will be described hereinafter. FIG. 13 is a diagram illustrating a configuration of the image processing device according to the third embodiment. FIG. 14 is a diagram illustrating a configuration of an image display system using the image processing device according to the third embodiment. With respect to the configuration of the image processing device 1a according to the third embodiment, portions corresponding to the configuration of the image processing devices 1 of the first embodiment and the second embodiment will be given the same reference signs and description of these portions will be omitted.

The image processing device 1a according to the third embodiment does not include the compositing processing unit 13 of the image processing device 1 according to the first embodiment. The image processing device 1a according to the third embodiment includes a main image dividing unit 125 and a main image transmitting unit 126 in the main image creating unit 12.

The main image dividing unit 125 divides the main image into a plurality of images. The divided images of the main image (divided main images) are output to the main image transmitting unit 126.

The main image transmitting unit 126 transmits the divided main images from the main image dividing unit 125 to a plurality of compositing devices 13a to 13h.

With reference to FIG. 14, the image display system using the image processing device 1a according to the third embodiment will now be described.

The image display system using the image processing device 1a according to the third embodiment has the image processing device 1a, the compositing devices 13a to 13h, a switch 7, and a video transmitting device 5.

With reference to FIG. 14, the configuration of the image display system according to the third embodiment will be described hereinafter.

The switch 7 distributes the divided main images transmitted from the image processing device 1a to the corresponding compositing devices 13a to 13h.

The video transmitting device 5 is a device that transmits a video image to a plurality of the compositing devices 13a to 13h.

The compositing devices 13a to 13h receive the divided main images that are output from the main image transmitting unit 126 and a video image that is output from the video creating unit 3. The compositing devices 13a to 13h extract portions corresponding to the divided main images from the video image and create a composite image which is divided (divided composite images). The divided composite images are a plurality of images which are divided from one composite image. By displaying the divided composite images using a plurality of display devices 4a to 4h to be described later, one composite image is displayed.

The display devices 4a to 4h display the divided composite images transmitted from the compositing devices 13a to 13h, respectively. That is, the display devices 4a to 4h allow an image similar to a composite image displayed with the display device 4 according to the first embodiment to be displayed on one large screen using a plurality of the display devices 4a to 4h.

The image processing device 1a according to the third embodiment is configured to have the compositing devices 13a to 13h and the switch 7 external to the image processing device 1a. However, the image processing device 1a may be configured to incorporate the compositing devices 13a to 13h and the switch 7.

The compositing devices 13a to 13h are configured to extract and composite video images from a video image which is output from the video transmitting device 5. However, the compositing devices 13a to 13h may be configured to receive pre-divided composite images. The compositing devices 13a to 13h are configured to receive the divided main images. However, the compositing devices 13a to 13h may be configured to receive the main image and then divide the main image.

As described above, the image processing device 1a according to the third embodiment is configured to divide the main image and transmit the divided images to a plurality of the display devices 4a to 4h, and thus can be applied to a large screen system which is composed with a plurality of the display devices 4a to 4h.

REFERENCE SIGNS LIST

1: image processing device, 2: window position operating unit, 3: video creating unit, 4: display device, 11: information calculating unit, 12: main image creating unit, 13: compositing processing unit, 111: window position managing unit, 112: window overlapping area calculating unit, 113: mask determining unit, 114: color key area calculating unit, 121: content data storage unit, 122: window drawing unit, 123: mask processing unit, 124: color key setting unit, 131: video reception processing unit, 132: background creating unit, 133: image compositing unit

The invention claimed is:

1. An image processing system that carries out chroma key compositing to layer a first layer image in which a first window for displaying a still image is drawn and a second layer image in which a second window for displaying a moving image is drawn, and to display the second window by making the first layer image transparent, the image processing system comprising:
   a mask determining unit that determines an overlap relation between the first window and the second window in an area where the first window and the second window overlap;
   a mask processing unit that, based on a determination by the mask determining unit, performs a mask process on an area where the first window overlaps as an upper window when it is determined that the first window overlaps as the upper window, and does not perform the mask process on an area where the second window overlaps as an upper window when it is determined that the second window overlaps as the upper window;
   a first layer image dividing unit that divides the first layer image;
   a compositing device that composites the first layer image that is divided and the second layer image corresponding to the first layer image; and
   a plurality of display devices that display an image that is composited by the compositing device,
   wherein the plurality of display devices form one screen.

* * * * *